April 3, 1956  N. ANDERSON  2,740,321
SIX-IN-ONE FADER ATTACHMENT FOR CAMERAS
Filed April 5, 1954  2 Sheets-Sheet 1

INVENTOR.
Norwood Anderson
BY Henry J. E. Metzler
Attorney

April 3, 1956 N. ANDERSON 2,740,321
SIX-IN-ONE FADER ATTACHMENT FOR CAMERAS
Filed April 5, 1954 2 Sheets-Sheet 2
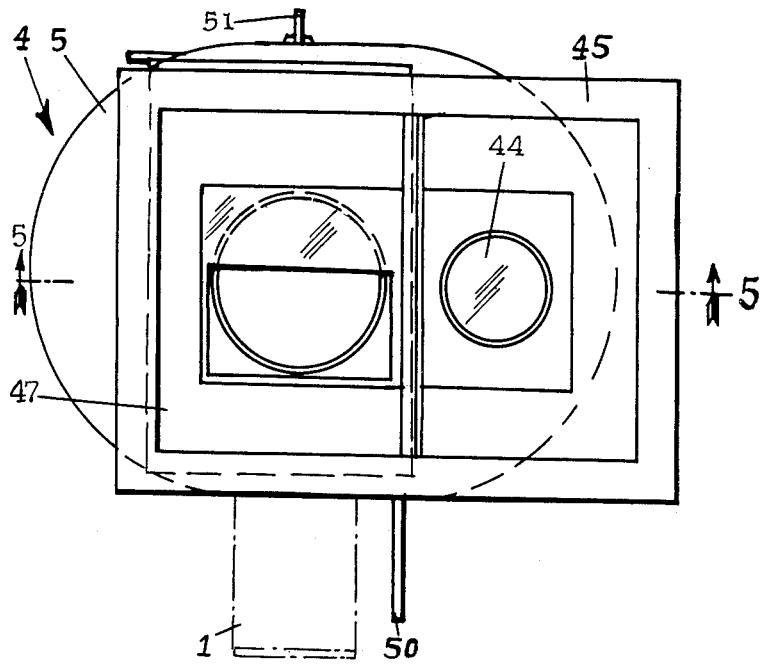
Fig.3.
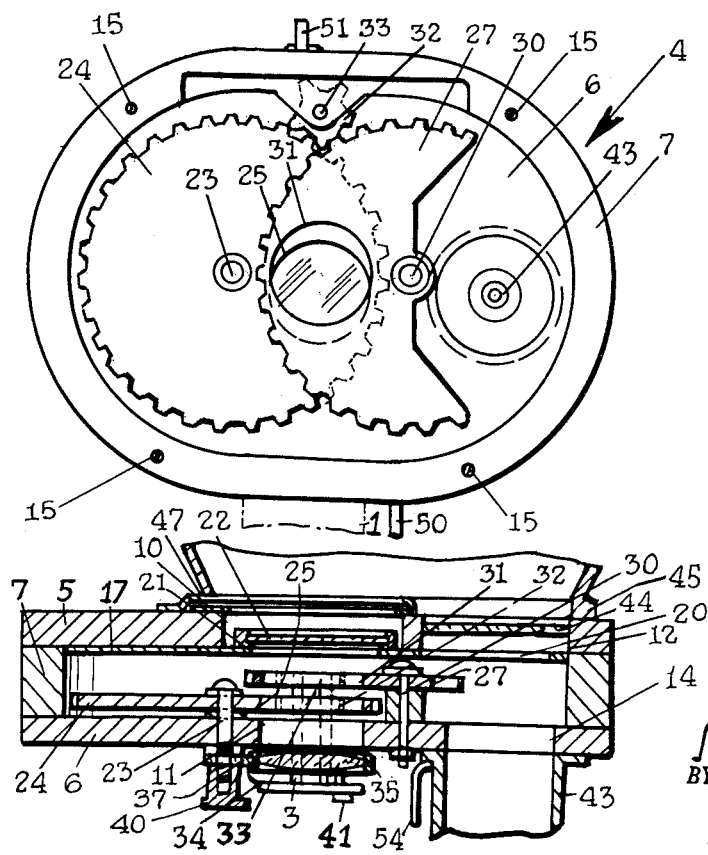
Fig.4.
Fig.5.
INVENTOR.
Norwood Anderson
BY
Attorney

United States Patent Office 2,740,321
Patented Apr. 3, 1956

2,740,321

SIX-IN-ONE FADER ATTACHMENT FOR CAMERAS

Norwood Anderson, New York, N. Y.

Application April 5, 1954, Serial No. 420,800

3 Claims. (Cl. 88—16)

The present invention relates to improvements in cameras, primarily motion picture cameras and the like, and, more specifically, to a new and improved attachment for such cameras. It is well-known to attach to a camera a lens shade, or/and a view finder, or/and a fader or the like. However, it is rather bothersome to maintain and to use various single attachments. Therefore, one object of the present invention is the provision of a device of the character described which combines in one single attachment the following six usually separate attachments: Firstly a view finder, secondly a title lens holder, thirdly an adjustable fader, fourthly a filter holder, fifthly a matte box, and sixthly a lens shade.

Another object of the present invention is the provision of a device of the character described which easily can be attached to existing cameras, although it can be made and provided on newly manufactured cameras also, and which is handy and practical in use.

A further object of the present invention is the provision of a device of the character described which has a new and improved fading device that functions as an auxiliary iris and is mounted in front of the camera lens.

Yet still another object of the present invention is the provision of a device of the character described which is light in weight, simple in construction, and inexpensive to manufacture, but which is also of a pleasing outer appearance, sturdy, durable, and well adapted for withstanding the rough usage to which devices of this type in the hands of amateurs are frequently subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawings a preferred form of the invention has been shown.

In said drawings:

Fig. 3 is a front elevation thereof;

Fig. 4 is a sectional view on the line 4—4 of Fig. 2; and,

Fig. 5 is a fractional sectional view on the line 5—5 of Fig. 3.

Similar reference characters refer to similar parts throughout the several views.

Figure 1:
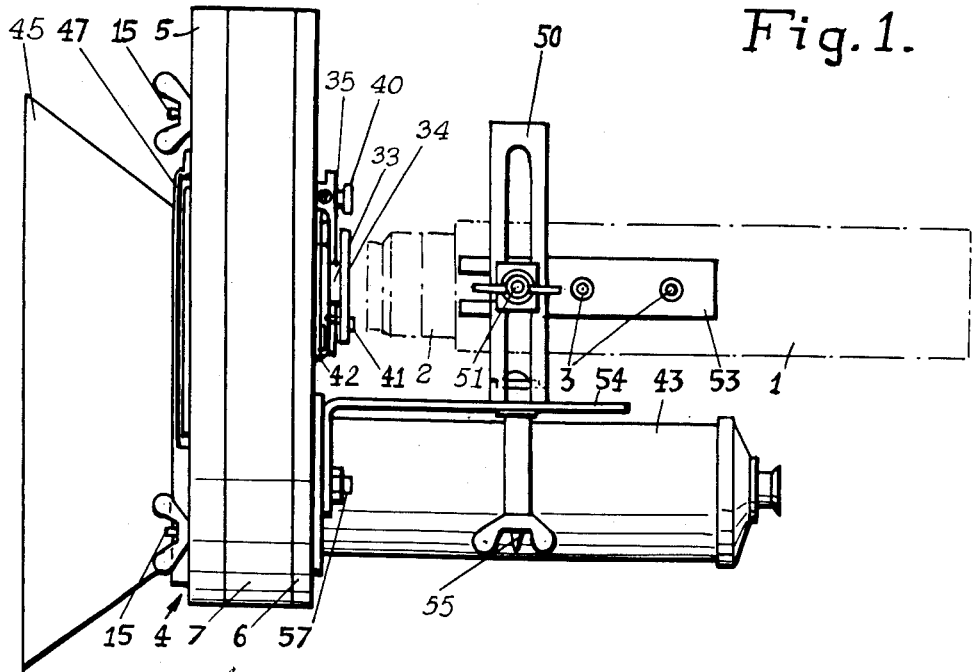
Figure 1 is a top plan view of a preferred embodiment of my invention.
Figure 2:
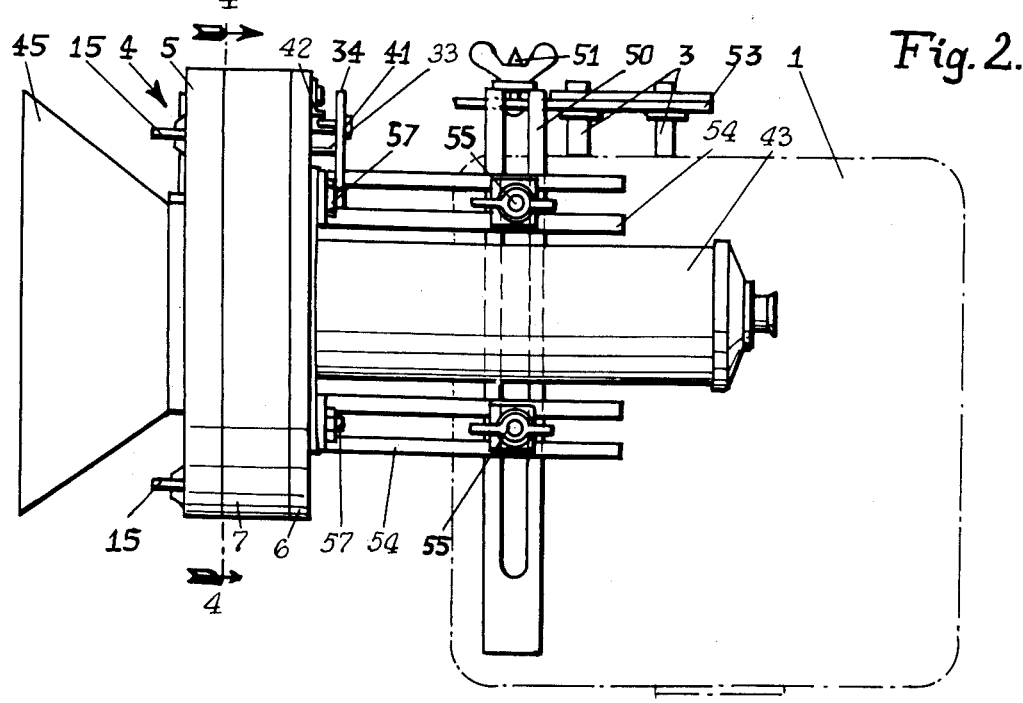
Fig. 2 is a side elevation thereof.

In the drawing the numeral 1 denotes a moving picture camera, which has a lens casing 2, and from which are extended a pair of bolts 3. The camera 1 and the casing 2 form no part of my present invention. My new and improved device, which I prefer to call a "Six-in-One-Line-Fader" is mounted on a housing 4, which has a front wall portion 5, a back wall portion 6 and a side wall portion 7 preferably of oblong shape. The back and the front wall portions of the housing 4 are provided with two pairs of holes 10, 11, 12, and 14. The centers of the holes 10 and 11 as well as the centers of the holes 12 and 14 are in registering alignment with each other. Between the side wall portions 7 and the front wall portion 5 of the casing, which portions are secured to each other by means of bolts 15 or the like, preferably is interposed a plate 17 (Fig. 5) which has an open recess 20 adjacent the opening 12 and a perforation 21 adjacent the opening 10. A lens 22 is mounted on that section of the plate 17 which encompasses the perforation 21.

Within the housing 4 there is rotatable on a pin 23 a disk 24 having a toothed outer rim portion and being provided intermediate a section of said rim portion and its center with a hole 25. The center of the hole 25 registers with the center of the hole 10 and with the center of the lens 22 when the disk 24 is in the position shown in Fig. 4. The numeral 27 denotes a sector-shaped member rotatably mounted in said housing on a second pin 30. The member 27 partially overlaps the disk 24 having a toothed arc-shaped portion and being provided intermediate a section of said arc-shaped portion and its center with a hole 31, whose center is at a distance from the pin 30 which is the same as the distance from the center of the hole 25 to the pin 23. Thus if the parts 24 and 27 are being rotated, for instance in opposite direction by the rotation of a pair of pinions 32 which engage the toothed portions of the parts 24 and 27, the aggregate light opening of the holes 25 and 31 will be changed from a maximum opening gradually to a complete closing thereof, which closing will cut off the light, so that no light will reach the camera lens. The pinions 32 are secured to a shaft 33 which extends through the wall portion 6 beyond the housing 4, and a knurled knob 34 is secured to that portion of the shaft 33 which protrudes beyond the housing 4. Thus by rotating the knob 34 the amount of light passing through the camera lens can be varied easily and speedily. A title lens holder 35 preferably is secured to the outer side of the wall portion 6 by means of a lug portion 37 through which extends a threaded portion of the pin 23, and a nut 40 secures the holder 35 firmly to the pin 23. The rotary movements of the parts 24, 27, and 32 preferably are limited by any suitable means, for instance by securing a screw 41 to the knob 34 and attaching to the wall portion 6 an angle bar 42, which is hit by the shaft of the screw 41 when the knob 34 is being turned to its end position. This limiting of said rotary movements prevents the member 27 from being moved into a position in which it could obstruct the view through the view finder 43, which is secured to the wall portion 6 and which surrounds the opening 14. A lens 44 preferably is inserted into the opening 12 and is provided with lines (not shown) for facilitating the view finding.

To the wall portion 5 there is secured a lens shade 45 which surrounds the openings 10 and 12. A matte box 47 is interposed between the lens shade 45 and that section of the wall portion 5 which is provided with the opening 10.

The housing 4, with its aforementioned elements, can be fastened to the camera 1 by any suitable means, preferably by means of an angular rail member 50 which is lengthwise slotted and through one branch of which extends a screw 51 securing it to a rail 53, while a pair of slotted bars 54 are secured to the other branch of the member 50 by means of screws 55. The rail 53 is secured to the camera 1 by means of the bolts 3, and the bars 54 are secured to the housing 4 by means of screws 57. This arrangement allows one and the same attachment to be used in connection with cameras of various types and sizes.

Since certain changes may be made in the above article and different embodiments of the invention could be made without departing from the scope thereof, it is intended that all matter contained in the above description or shown

Having thus fully described my said invention, what I claim as new and desire to secure by Letters Patent is:

1. A six-in-one fader attachment for cameras comprising a closed housing having front and back wall portions as well as side wall portions and having in each of its front and back wall portions a pair of openings which are in registering alignment with each other, adjustable fastening means secured to said housing for attaching said housing to a camera in such a manner that the lens of the camera is in registering alignment with the first one of said openings in the back wall portion of said housing, a view finder secured so that section of the back wall portion of said housing which encompasses the second one of said openings, a title lens holder mounted on that section of the back wall portion of said housing which encompasses the first one of said openings and arranged in such a manner that it is located between said last-mentioned opening and the lens of the camera, a fader within said housing for controlling the passing of light through the first one of said openings in the front and back wall portions of said housing, fader operating means extending from said fader through a wall portion of said housing to the outer side of said housing, a lens shade secured to the front wall portion of said housing surrounding both openings thereof, a matte box between said lens shade and said housing and mounted on that portion of said housing which is provided with the first one of said openings, and a filter holder provided between said lens shade and that portion of said housing which is provided with the second one of said openings.

2. A six-in-one fader attachment for cameras comprising a closed housing having front and back wall portions as well as side wall portions and having in each of its front and back wall portions a pair of openings which are in registering alignment with each other, adjustable fastening means secured to said housing for attaching said housing to a camera in such a manner that the lens of the camera is in registering alignment with the first one of said openings in the back wall portion of said housing, a view finder secured to that section of the back wall portion of said housing which encompasses the second one of said openings, a title lens holder mounted on that section of the back wall portion of said housing which encompasses the first one of said openings and arranged in such a manner that it is located between said last-mentioned opening and the lens of the camera, a pair of disks partially overlapping each other being rotatably mounted within said housing and each disk having a hole arranged in such a manner that it registers—in a predetermined position of the disks—with the hole in the other disk as well as with the first one of said openings in the front and back wall portions of said housing, means for rotating said disks in opposite direction extending from the interior of said housing through a wall portion of said housing to the outer side of said housing, and a lens shade secured to the front wall portion of said housing surrounding both openings thereof.

3. A six-in-one fader attachment for cameras comprising a closed housing having front and back wall portions as well as side wall portions and having in each of its front and back wall portions a pair of openings which are in registering alignment with each other, adjustable fastening means secured to said housing for attaching said housing to a camera in such a manner that the lens of the camera is in registering alignment with the first one of said openings in the back wall portion of said housing, a view finder secured to that section of the back wall portion of said housing which encompasses the second one of said openings, a title lens holder mounted on that section of the back wall portion of said housing which encompasses the first one of said openings and arranged in such a manner that it is located between said last-mentioned opening and the lens of the camera, a disk rotatably mounted in said housing having a toothed outer rim portion and being provided intermediate a section of said rim portion and its center portion with a hole which is in registering alignment with the first one of said openings in the front and back wall portions of said housing when said disk is in a predetermined position, a sector-shaped member rotatably mounted in said housing having a tooth arc-shaped portion and being provided intermediate a section of said arc-shaped portion and its center portion with a hole which is in registering alignment with the first one of said openings in the front and back wall portions of said housing as well as with the hole in said disk when the disk and the sector-shaped member are in predetermined positions, a pair of pinions engaging the toothed portions of said disk and said arc-shaped member respectively so as to turn the same in opposite direction when the pinions rotate in the same direction, a shaft to which said pinions are secured being rotatably mounted in said housing and extending from the interior of said housing through a wall portion of said housing to the outer side of said housing, a knob secured to that portion of said shaft which extends beyond said housing, means for limiting the movement of said shaft being provided thereon, a lens shade secured to the front wall portion of said housing surrounding both openings thereof, a matte box between said lens shade and said housing and mounted on that portion of said housing which is provided with the first one of said openings, and a filter holder provided between said lens shade and that portion of said housing which is provided with the second one of said openings.

References Cited in the file of this patent

UNITED STATES PATENTS

| | | |
|---|---|---|
| 1,885,555 | Schwarz | Nov. 1, 1932 |
| 2,273,430 | Bing | Feb. 17, 1942 |
| 2,533,909 | Bak | Dec. 12, 1950 |
| 2,641,952 | Mellert | June 16, 1953 |